March 30, 1954

H. J. FINCH 2,673,751

METAL PIPE AND COUPLING THEREFOR

Filed Dec. 5, 1950

Inventor
Harry J. Finch
G. R. Harris
Attorney

March 30, 1954  H. J. FINCH  2,673,751
METAL PIPE AND COUPLING THEREFOR
Filed Dec. 5, 1950  2 Sheets-Sheet 2

Inventor
Harry J. Finch
By
G. R. Harris
Attorney

Patented Mar. 30, 1954

2,673,751

UNITED STATES PATENT OFFICE 2,673,751

METAL PIPE AND COUPLING THEREFOR

Harry J. Finch, Oil City, Pa., assignor to Jones & Laughlin Steel Corporation, Pittsburgh, Pa., a corporation of Pennsylvania Application December 5, 1950, Serial No. 199,228

2 Claims. (Cl. 285—175)

This invention relates to metal pipe sections, the ends of which are formed so as to allow rapid connection together of such sections, or rapid disconnection of coupled sections. My invention is more particularly concerned with thin-walled metal pipe having connecting or coupling means produced by working or deforming the metal wall of the pipe.

Thin-walled metal pipe, which is generally produced by bending cold rolled strip into shape and welding the seam, is employed where its light weight and consequent portability are determining factors. One such use is for irrigation tubing in arid regions. Irrigation tubing is made up of lengths of light-weight thin-walled pipe coupled together, and is laid on the surface of the ground where it may be readily moved, either with or without disconnecting according to the requirements of the crops. For temporary usage of this type it is desirable that the connections between successive sections of pipe be made rapidly and that disconnection of such sections be equally rapid.

Another use of thin-walled metal pipe is for so-called "shot hole" casing. In seismic exploration for oil fields it is necessary to drill holes into the ground, at the bottom of which explosive charges are set off. These shot holes, when drilled in sandy soil, may, if uncased, cave in upon the shooting of one charge only. When shot holes are drilled in marshy locations it may be impossible to keep water from filling an uncased hole. It is therefore common practice to case shot holes with thin-walled metallic tubing, which may be easily handled in the field. Successive lengths of the tubing must be connected as the casing is lowered into the hole, and it is quite desirable that such connections be rapidly and efficiently made. In addition, a shot hole casing connection or coupling must support the weight of the casing hanging below it in the hole, or a force somewhat greater than this if the casing is to be pulled from the hole after its use.

The wall thickness of thin-walled tubing generally used for the above-mentioned purposes is such that the cutting of normal pipe threads is impossible. Attempts have been made to couple such pipe with shallow-cut threads, but joints so made up have very low pull-out strength. Threaded thin-walled tubing conventionally used for the above applications has threads produced by deforming the metal of the pipe wall either by rolling, expanding dies, or other means. A thin-walled pipe having a rolled thread is the subject of my co-pending application Serial No. 189,828. Although threaded pipe couplings can be made with a high pull-out strength, such connections are not made very rapidly as the pipe must be rotated a number of times to make a tight connection.

It is therefore an object of the present invention to provide a thin-walled pipe with connecting means capable of being made up and disassembled in a fractional turn of the pipe. It is a further object to provide a pipe with rapid connecting means which can be locked against inadvertent disconnecting. It is a still further object of my invention to provide a pipe having rapid connecting means of high pull-out strength. Other objects will appear in the course of the description of my invention.

My invention comprises metal pipe having box and pin ends adapted to telescope one in the other. As normally manufactured, the pin end of the pipe has the same diameter as the body of the pipe, while the box end is expanded to fit over the pin end. The pin end has formed on its outer surface a plurality of groups of raised cams or lugs, while the box end is formed with corresponding depressions on its inner surface adapted to accept the raised lugs and engage tightly with them when the two ends are rotated relative to each other a fractional part of a turn. My invention will be more readily understood by reference to the attached figures which illustrate two present preferred embodiments.

Of these,

Figure 1:
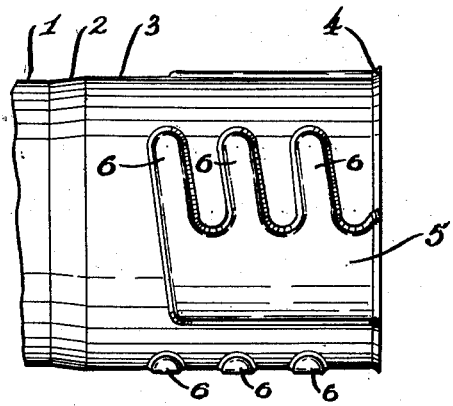
Figure 1 represents an elevation of the box end of a section of pipe embodying my invention.
Figure 2:
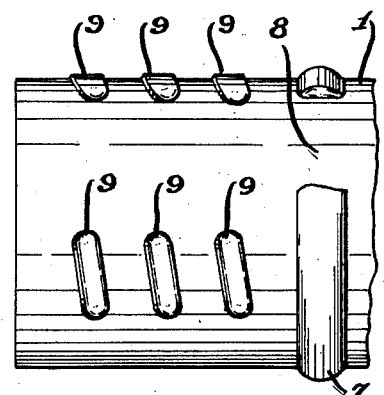
Figure 2 is an elevation of the pin end of a similar pipe.
Figure 3:
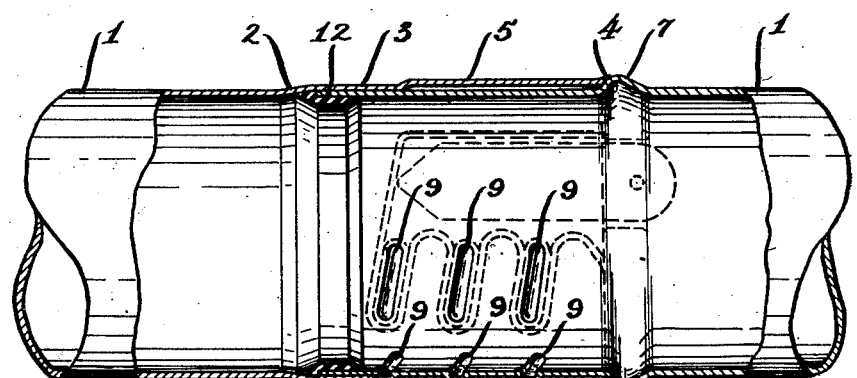
Figure 3 is a vertical section through a joint made up of box and pin ends as shown in Figures 1 and 2.

The pipe 1 of my invention is expanded at the box end into a tapering portion 2 which merges into the enlarged end section 3. This end section 3 terminates in a flare 4 which facilitates the entrance of the pin end. The enlarged end section 3 of the box end has formed on its inner surface pockets or longitudinal depressions 5 which extend circumferentially on one side thereof into finger-like channels 6. As these depressions are formed in thin-walled tubing by working or deforming the pipe wall, they appear also as projections on the outer surface of the box end. The box end shown in Figure 1 has three pockets 5, each provided with three channels 6, but my invention is not confined to any particular number of these. The pin end shown in Figure 2 is formed with an annular projection or shoulder 7 provided with a gap 8 approximately the width of a pocket 5, the purpose of which will be set out below. Between this annular shoulder 7 and the end of the pipe are located on its outer surface a plurality of axial rows of raised lugs 9. The embodiment of my invention illustrated in Figure 2 is provided with three groups containing three each of these lugs 9. The circumferential length of these lugs 9 is slightly less than the width of the pocket 5 in the box end, and the width of each lug 9 measured axially of the pipe is slightly less than the width of the channels 6. These lugs 9 are so arranged with respect to the box end that when the box and pin ends of successive pipe sections are aligned as shown in Figures 1 and 2, the pin end enters fully into the box end, the lugs 9 of the pin end being accommodated by the enlarged pocket-shaped depressions 5 of the box end. A slight rotation of the pin end relative to the box end causes the lugs 9 to rotate into the channels 6 as shown in cross-section in Figure 3. Figure 3 also illustrates a desirable square-edged cross-section of the lugs 9 and the channels 6. The lugs 9 may be tapered slightly in height from end to end or the channels 6 may be tapered in depth in the same way so that the lugs fit tightly in the channels when the coupled ends are rotated.

The projections or lugs 9 of the pin end of my invention and the corresponding channels 6 into which they rotate when the joint is made up are not sections of continuous helical threads. The long axis of each lug 9 is inclined to a plane perpendicular to the axis of the pipe by the same amount, an angle which I prefer to make about 8°, but each row of three lugs 9 which are contained within a single pocket 5 of the pin end is identically spaced between the end of the pipe 1 and the annular projection 7 with every other such group of lugs. Likewise, each pocket 5 and laterally extending channels 6 on the pin end is identical with every other such pocket and extending channels; thus the pin end may enter the box end regardless of which group of lugs 9 enters which pocket 5, and the joint can be made up by the same fractional rotation of the two ends relative to each other.

The annular projection 7 on the pin end provides a shoulder against which the flare 4 of the box end engages when the pipe joint is made up tight. The gap 8 in this annular shoulder 7 is positioned so that it comes opposite a pocket 5 when the joint is made up, as is shown clearly in Figure 6. Into this open ended pocket 5 left vacant when the lugs 9 are rotated into the laterally extending channels 6 may be slipped a locking key 11, which is merely a flat or slightly laterally curved piece of metal of a thickness equivalent to the height of the lugs 9. When this locking key 11 is in place, the joint cannot be broken down and the pipes disconnected since the presence of the key 11 in the pocket 5 prevents the lugs 9 from being rotated back into pocket 5 through which they must be withdrawn. The annular shoulder 7 effectively closes off the mouths of the other pockets 5 when the joint is tightly made up, thus preventing the entrance of dirt and foreign matter which otherwise might interfere with the breaking down of the joint. The shoulder 7 on the pin end and tapered portion 2 of the box end cooperate with the open ends or annular termini of box and pin ends, respectively, to form a firm or non-wobbling joint. The annular terminus of the pin end engages the tapered portion 2 of the box end when the flare 4 of the box end engages the shoulder 7 of the pin end, thus aligning the coupling or joint at each end.

Figure 4:
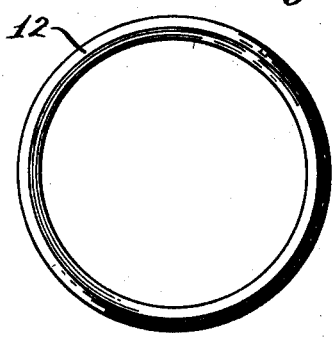
Figure 4 is an end elevation, and Figure 5 a vertical cross-section through the gasket which may be used with my invention.
Figures 5, 6:
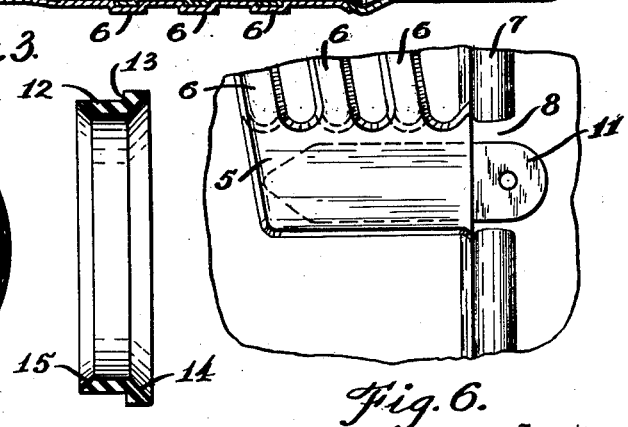
Figure 6 is a detail view of a locking means forming part of my invention.

My joint may be made liquid-tight by the inclusion of a gasket 12 of rubber or other deformable material as shown in Figures 4 and 5. This gasket is provided with an outwardly extending annular shoulder 13 and internally tapered or flared ends 14 and 15. The gasket is held in place within the pin end of my joint by projecting shoulder 13, and when the joint is made up, this shoulder 13 is forced against the tapered portion 2 of the box end to make a liquid-tight seal.

Figure 7:
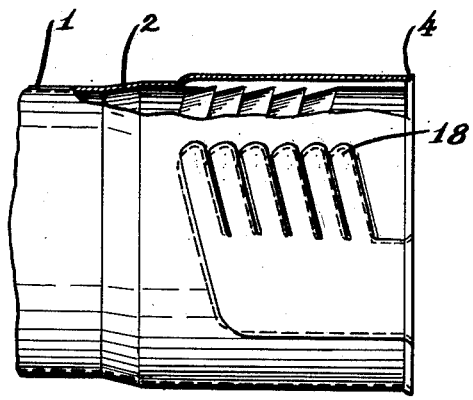
Figure 7 is an elevation partly in section of a box end of a second preferred embodiment of my invention.
Figure 8:
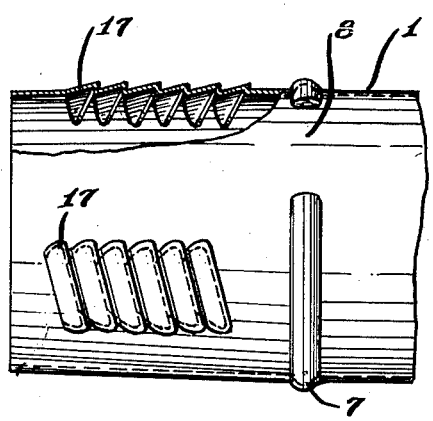
Figure 8 is an elevation partly in section of a pin end of this second embodiment.
Figure 9:
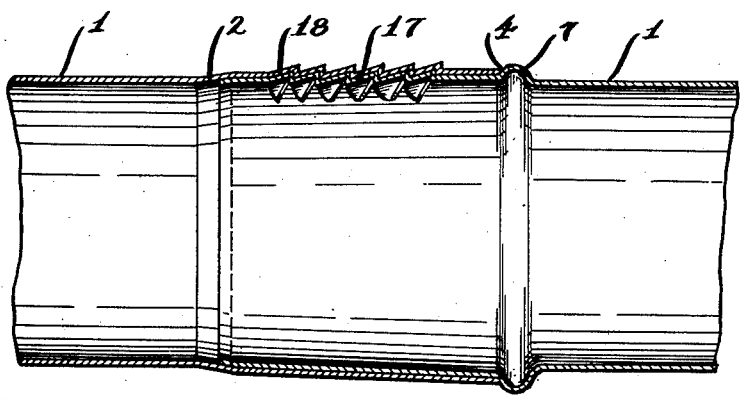
Figure 9 is a vertical section through a joint made up of the box and pin ends of Figures 7 and 8.

Figures 7, 8 and 9 illustrate a second embodiment of my invention which is preferred where high pull-out strength is required. The principal difference between this embodiment and that previously described lies in the shape of the lugs 17 formed in the pin end of the pipe and the channels 18 in the box end. As may be seen in the sectional views of Figures 8 and 9, these lugs and channels are of buttress or saw-tooth contour or cross-section. This cross-section permits a much closer grouping of both lugs and channels; Figure 8, for example, shows six lugs 17 disposed within the axial space required by the three lugs 9 of Figure 2. By comparing the joint of Figure 9 with that of Figure 3 it will be seen that the former has an area of box and pin end engagement normal to the pipe axis twice that of Figure 3. Again three rows of cams or lugs are shown in the pin end and three cooperating pockets and channels in the box end, but it will be understood that this arrangement is optional, and a greater or smaller number could be employed if desired. The pipe joint illustrated in Figure 9 also differs somewhat from that of Figure 3 in that both box and pin ends taper slightly. This taper facilitates "stabbing"—the vertical entry of the pin end of a pipe section to be coupled with the box end of a section set into the ground.

Although I have described and illustrated the present preferred embodiments of my invention, it will be understood that the invention is not limited thereto but may be otherwise embodied or practiced within the scope of my claims.

I claim:

1. A coupling for thin walled metal pipe comprising a pin end having portions of its wall displaced to form a plurality of axial rows of raised elongated lugs each inclined to a plane perpendicular to the pipe axis, a snugly mating expanded box end having portions of its wall displaced to form a plurality of pockets each adapted to receive a row of pin end lugs and extending circumfertntially into channels each adapted to receive one lug, an annular shoulder on the pin end positioned to engage the annular terminus of the box end when said pin end lugs are in said channel, said shoulder being interrupted at a region opposite the mouth of a box end pocket, and an elongated removable key fitting within and substantially filling a pocket of the box end and extending into the interrupted region of the annular shoulder.

2. A coupling for thin walled metal pipe comprising a pin end having portions of its wall displaced to form a plurality of axial rows of raised elongated lugs each inclined to a plane perpendicular to the pipe axis, a snugly mating expanded box end having portions of its wall displaced to form a plurality of pockets each adapted to receive a row of pin end lugs and extending circumferentially into channels each adapted to receive one lug, an annular tapered shoulder at the junction of the box end and the pipe body positioned to engage the annular terminus of the pin end and an annular shoulder on the pin end positioned to engage the annular terminus of the box end when said pin end lugs are in said channels, said shoulder being interrupted at a region opposite the mouth of a box end pocket, and an elongated removable key fitting within and substantially filling a pocket of the box end and extending into the interrupted region of the annular shoulder.

HARRY J. FINCH.

References Cited in the file of this patent

UNITED STATES PATENTS

| Number | Name | Date |
|---|---|---|
| 186,290 | Allen | Jan. 16, 1877 |
| 189,477 | Lightburne | Apr. 10, 1877 |
| 305,140 | Bradley | Sept. 16, 1884 |
| 836,457 | Pellar | Nov. 20, 1906 |
| 939,036 | Koper | Nov. 2, 1909 |
| 1,189,052 | Brookshire | June 27, 1916 |
| 1,324,897 | Holub | Dec. 16, 1919 |
| 2,094,491 | Janata | Sept. 28, 1937 |
| 2,165,163 | Waters | July 4, 1939 |
| 2,321,778 | Stout | June 15, 1943 |
| 2,508,716 | Hauf | May 23, 1950 |
| 2,510,377 | Carr | June 6, 1950 |

FOREIGN PATENTS

| Number | Country | Date |
|---|---|---|
| 746,630 | France | June 2, 1933 |